United States Patent
Beck

(10) Patent No.: US 7,097,015 B2
(45) Date of Patent: Aug. 29, 2006

(54) SUSPENSION SYSTEM FOR MOTOR VEHICLES

(75) Inventor: Hubert Beck, Eitorf (DE)

(73) Assignee: ZF Sachs AG, Eitorf (DE)

(*) Notice: Subject to any disclaimer, the term of this patent is extended or adjusted under 35 U.S.C. 154(b) by 0 days.

(21) Appl. No.: 10/773,476

(22) Filed: Feb. 6, 2004

(65) Prior Publication Data
US 2004/0178033 A1 Sep. 16, 2004

(30) Foreign Application Priority Data
Feb. 7, 2003 (DE) ................ 103 04 915

(51) Int. Cl.
*B60G 17/04* (2006.01)
(52) U.S. Cl. .................................... 188/315
(58) Field of Classification Search ................ 188/315, 188/322.21; 267/64.28
See application file for complete search history.

(56) References Cited

U.S. PATENT DOCUMENTS

| | | | | |
|---|---|---|---|---|
| 2,571,279 A | * | 10/1951 | Myklestad | ................ 188/315 |
| 2,997,291 A | * | 8/1961 | Stultz | ........................ 188/266 |
| 3,653,689 A | * | 4/1972 | Sapy et al. | ................ 285/113 |
| 3,945,663 A | * | 3/1976 | Duckett | ................ 280/6.159 |
| 4,240,654 A | * | 12/1980 | Gladieux | ................ 285/276 |
| 4,475,577 A | * | 10/1984 | Cubalchini | ................ 141/349 |
| 4,645,245 A | * | 2/1987 | Cunningham | ............. 285/321 |
| 4,700,815 A | * | 10/1987 | Persicke et al. | ........... 188/286 |
| 4,795,009 A | * | 1/1989 | Tanahashi et al. | ........ 188/315 |
| 4,941,764 A | * | 7/1990 | Breitwieser et al. | ....... 403/24 |
| 5,226,682 A | * | 7/1993 | Marrison et al. | .......... 285/308 |
| 5,927,761 A | * | 7/1999 | Bartholomew | ............ 285/114 |
| 6,116,585 A | | 9/2000 | Lutz | |
| 6,648,309 B1 | | 11/2003 | Beck | |

* cited by examiner

*Primary Examiner*—Christopher P. Schwartz
(74) *Attorney, Agent, or Firm*—Cohen, Pontani, Lieberman & Pavane

(57) ABSTRACT

A suspension system for motor vehicles includes a piston-cylinder assembly having a working cylinder, a piston rod guidably inserted in a piston rod guide in the cylinder, and a damping piston having damping valves movably arranged in the working cylinder and connected to the piston rod. A shape-changing, enclosed envelope body is provided as an equalization space. A wall of the enclosed envelope is a gas-tight blocking layer. A connecting element connected to the enclosed envelope body is held in the piston rod guide, wherein the connecting element is non-detachably inserted into a drilled hole defined in the piston rod guide.

9 Claims, 2 Drawing Sheets

Fig.1

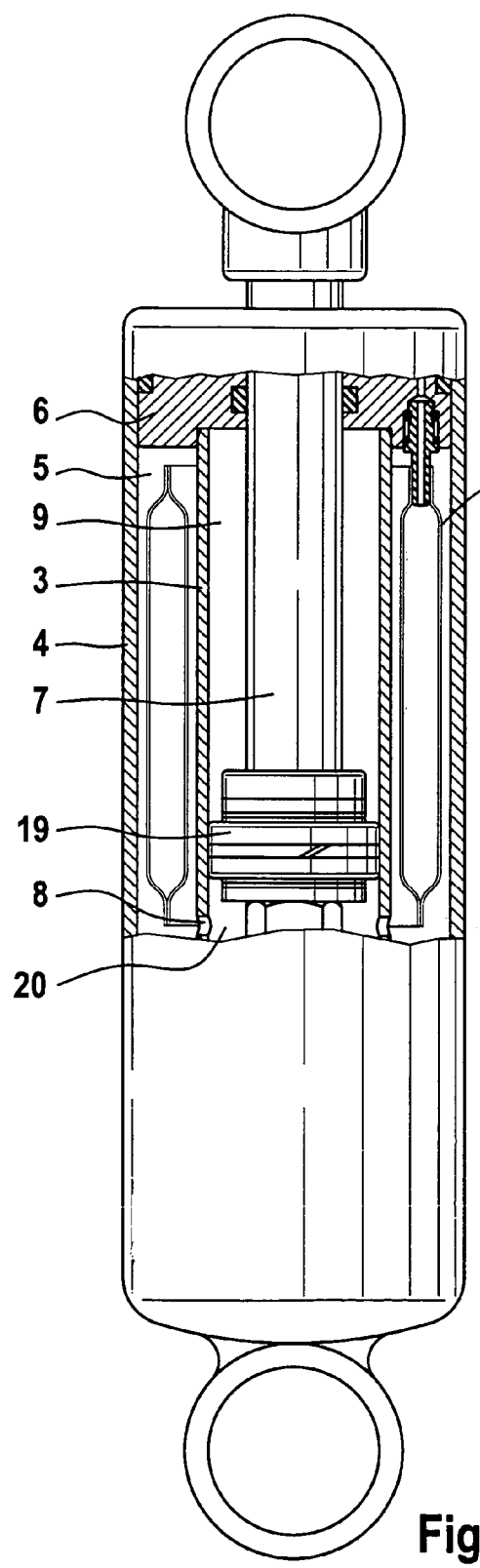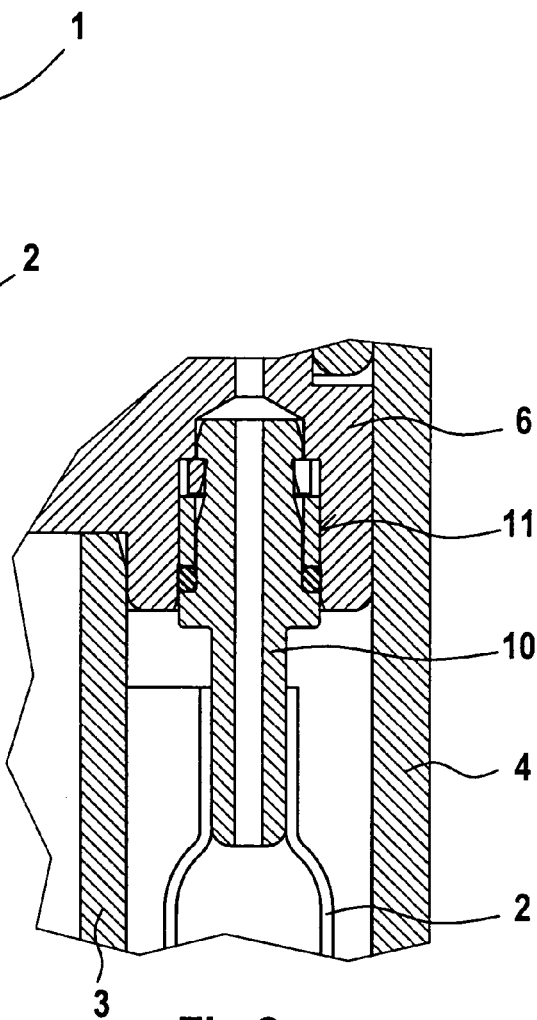
Fig.1
Fig.2

SUSPENSION SYSTEM FOR MOTOR VEHICLES

BACKGROUND OF THE INVENTION

1. Field of the Invention

The invention relates to a suspension system for motor vehicles which includes a piston-cylinder assembly with a working cylinder, a piston rod guidably inserted in a piston rod guide in the cylinder, a damping piston having damping valves, and a shape-changing, enclosed envelope body provided as an equalization space, the wall of the envelope body being a gas-tight blocking layer, wherein a connecting element for connecting the envelope body to a flow connection is held in the piston rod guide.

2. Description of the Related Art

Level regulating elements and shock absorbers in which the volume equalization of the piston rod is performed by an envelope body which is filled with gas are disclosed in U.S. Pat. Nos. 6,648,309 and 6,116,585.

U.S. Pat. No. 6,648,309 discloses the gas filling method of the envelope body, but not the way of bringing about a secure, satisfactory attachment of the envelope body in the piston rod guide. U.S. Pat. No. 6,116,585 discloses a filling connection which Is arranged on an outer wall of the envelope body and which corresponds to an opening in an outer tube wall. However, the attachment of the envelope body is not explained in detail here.

SUMMARY OF THE INVENTION

It is an object of the present invention to provide a suspension system for motor vehicles in which an enclosed body with a variable shape is provided and is secured in the suspension system such that the enclosed body is held in a sealed and fixed fashion in an equalization space and such that a flow connection is provided which permits gas to be filled in from the outside.

The object of the present invention is achieved by plugging the connecting element into a drilled hole in the piston rod guide and fixing it therein in a nondetachable fashion.

A securing ring which interacts with a shoulder of the connecting element is arranged in a groove in the drilled hole. The connecting element is fixed in the end weld on the envelope body. Furthermore, the securing ring is preferably embodied as a snap ring.

The securing ring may comprise a resilient or elastic ring.

The securing ring is arranged in the groove such that there is a space between the securing ring and the groove base when the securing ring is in a relaxed state such that the securing ring can be urged to move toward or dip into the groove base.

The securing ring may also have an insertion slope to facilitate satisfactory securement of the envelope body.

A bushing may be arranged in the drilled hole to form the groove in which the securing ring is received. This allows the groove to be provided using simple fabrication technology.

In order to obtain a satisfactory seal of the equalization space with respect to the interior of the envelope body, a seal may be held in the drilled hole.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views:

FIG. 1 is a longitudinal sectional view of a self-pumping hydro-pneumatic shock absorbing leg according to an embodiment of the present invention;

FIG. 2 is a detailed sectional view of a portion of an envelope body with its connecting element of the self-pumping hydro-pneumatic shock absorbing leg of FIG. 1.

DETAILED DESCRIPTION OF THE PRESENTLY PREFERRED EMBODIMENTS

Figure 3:
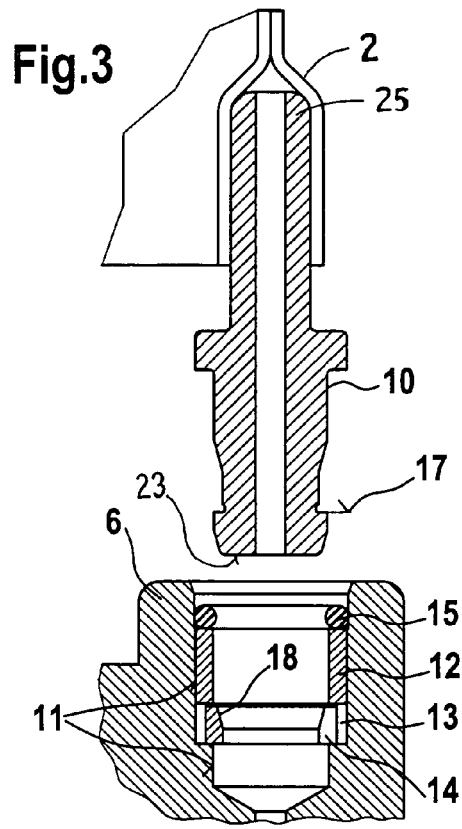
FIGS. 3–6 are sectional views of the connecting element at different steps during the process of mounting the connecting element in a drilled hole of a piston rod guide of the self-pumping hydro-pneumatic shock absorbing leg of FIG. 1.

FIG. 1 shows a self-pumping hydro-pneumatic shock absorbing leg, it being also conceivable to have a vibration damper, composed of a working cylinder 3 in which a piston 19 is movably arranged. An upper working space 9 is defined in the working cylinder 3 between the piston 19 and a piston rod guide 6. The piston 19 is connected to a piston rod 7 which guided through the piston rod guide 6 to the atmosphere. A lower working space 20 in the working cylinder 3 is connected to the equalization space 5 via the opening 8.

An outer tube 4 forms an equalization space 5 coaxially around the working cylinder 3. An envelope body 2 having a variable shape is arranged in the equalization space 5 and is connected through the piston rod guide 6 to the atmosphere (the connection of the envelope body is described in more detail below).

FIG. 2 shows, as a detail, the working cylinder 3 which is surrounded by the outer tube 4 and the piston rod guide 6 with a drilled hole 11 being held between the working cylinder 3 and the outer tube 4. A connecting element 10 of the envelope body 2 is held in the drilled hole 11.

FIGS. 3 to 6 show the various stages of a mounting sequence for mounting the envelope 2 and connecting element 10 in the drilled hole or bore 11 of the piston rod guide 6. As shown in FIG. 3, the connecting element 10 has a rear end 25 connected to the envelope 2 and a front end 23 which is insertable into the drilled hole 11. A shoulder 17 proximate the front end 23 of the connecting element 10 faces the rear end 25 of the connecting element. FIG. 3 shows the connecting element just prior to the mounting operation. The drilled hole 11 is shown in the piston rod guide 6 and is fitted with a bushing 12 forming a groove 13. A resilient securing ring 14 is inserted in the groove 13 and a sealing ring 15 is arranged at a side of the bushing opposite the groove 13. A diameter of the groove base of the groove 13 is dimensioned such that the securing ring can be resiliently urged radially outward into the groove base. Furthermore, the securing ring 14 is provided with an insertion slope 18 facing the bushing 12, thereby facilitating the insertion of the connecting element 10.

Figure 4:
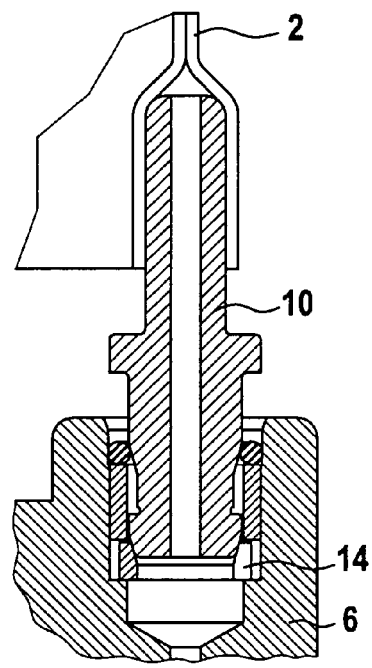

FIG. 4 shows the connecting element 10 is inserted into the drilled hole 11 such that the connecting element 10 touches the securing ring 14. Further insertion of the connecting element 10 forces the securing ring 14 radially outwards in its groove 13 and in the process the insertion slope 18 and a corresponding counterslope of the connecting element 10 ensure satisfactory mounting.

Figure 5:
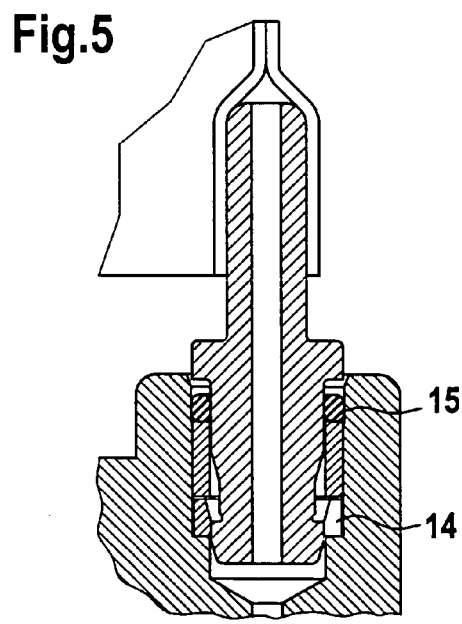

As the connecting element 10 dips further into the drilled hole 11, the securing ring 14 moves completely into the groove 13, as is apparent from FIG. 5. At this position of the connecting element 10, the seal 15 also assumes its sealing position.

Figure 6:
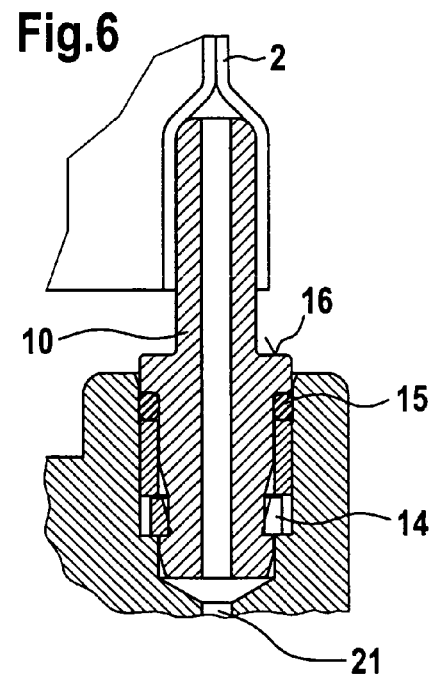

FIG. 6 shows the final mounting state of the securing element 10 in the drilled hole 11. Once the shoulder 17 of the connecting element passes the securing ring 14, the securing ring 14 resiles toward its relaxed position as shown in FIG. 6. As a result, the shoulder 17 engages the securing ring 14 such that the securing element 10 is prevented from withdrawal from the drilled hole 11. The sealing ring 15 and a flange 16 on the connecting element 10 provide the appropriate seal between the equalization space 5 and the drilled hole 11. The connection element 10 connects the interior of the envelope 4 with a flow connection 21 in the piston rod guide, which runs to the atmosphere so that the envelope body 2 can be appropriately filled, is shown in the lower region of Fig. 6. This filling may be accomplished, for example, as described in U.S. Pat No. 6,648,309.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A suspension system for motor vehicles, comprising: a piston-cylinder assembly of a suspension system for a motor vehicle having a working cylinder, a piston rod guidably inserted in a piston rod guide fitted to said working cylinder, a damping piston having damping valves, said damping piston being movably arranged in said working cylinder and connected to said piston rod, an enclosed envelope body provided in an equalization space, wherein a wall of said enclosed envelope is a gas-tight blocking layer having a changeable shape, a connecting element held in a bore defined in said piston rod guide, a longitudinal direction of said bore being approximately parallel to a longitudinal direction of said working cylinder, a bushing defining a side of a circumferential groove in said bore, and a resilient securing ring arranged in said groove, wherein said connecting element is connected to said enclosed envelope and non-detachably inserted into said bore in said piston rod guide for connecting said enclosed envelope to a flow connection, said connecting element having a shoulder which is engaged by said securing ring to prevent withdrawal of said connecting element from said bore.

2. The suspension system of claim 1, wherein said securing ring is expandable into a groove base of said groove.

3. The suspension system of claim 1, wherein said bore has an opening facing said enclosed envelope and said securing ring has an insertion slope which slopes radially outward toward said opening of said bore.

4. The suspension system of claim 1, wherein said bushing is inserted into and fixed directly to a side of said bore, said bushing defining a side of said groove.

5. The suspension system of claim 4, wherein said bore is a drilled hole, said groove being defined by said bore and said bushing.

6. The suspension system of claim 1, further comprising a seal arranged in said bore.

7. The suspension system of claim 1, wherein a first end of said connecting element is inserted in said bore and said shoulder faces away from said first end.

8. The suspension system of claim 1 wherein the envelope body has an end weld, the connecting element being fixed in the end weld.

9. The suspension system of claim 1 wherein the securing ring is a snap ring.

\* \* \* \* \*